(12) United States Patent
Kumagai et al.

(10) Patent No.: US 11,074,402 B1
(45) Date of Patent: Jul. 27, 2021

(54) LINGUISTICALLY CONSISTENT DOCUMENT ANNOTATION

(71) Applicant: International Business Machines Corporation, Armonk, NY (US)

(72) Inventors: Ken Kumagai, Tokyo (JP); Chikako Oyanagi, Tokyo (JP); Akihiro Nakayama, Tokyo (JP)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 16/841,847

(22) Filed: Apr. 7, 2020

(51) Int. Cl.
*G06F 17/00* (2019.01)
*G06F 40/169* (2020.01)
*G06F 40/211* (2020.01)
*G06F 40/30* (2020.01)

(52) U.S. Cl.
CPC .......... *G06F 40/169* (2020.01); *G06F 40/211* (2020.01); *G06F 40/30* (2020.01)

(58) Field of Classification Search
CPC ....... G06F 40/169; G06F 40/211; G06F 40/30
See application file for complete search history.

(56) References Cited

U.S. PATENT DOCUMENTS

| 7,912,705 | B2* | 3/2011 | Wasson | G06F 40/289 |
| | | | | 704/9 |
| 8,583,422 | B2* | 11/2013 | Todhunter | G06F 16/3329 |
| | | | | 704/9 |
| 9,524,289 | B2* | 12/2016 | Rachevsky | G06F 40/30 |
| 10,002,117 | B1* | 6/2018 | Ain | G06F 40/143 |
| 10,713,519 | B2* | 7/2020 | Bui | G06K 9/00456 |
| 2002/0046018 | A1* | 4/2002 | Marcu | G06F 40/35 |
| | | | | 704/9 |
| 2004/0078190 | A1* | 4/2004 | Fass | G06F 16/38 |
| | | | | 704/7 |
| 2011/0161070 | A1* | 6/2011 | Chen | G06F 40/30 |
| | | | | 704/9 |
| 2014/0215305 | A1* | 7/2014 | Vanderwende | G06F 40/169 |
| | | | | 715/230 |

(Continued)

OTHER PUBLICATIONS

"Mini-introduction to brat," Introduction—brat rapid annotation tool, printed: Aug. 7, 2019, 2 pgs, https://brat.nlplab.org/introduction.html.

(Continued)

*Primary Examiner* — Laurie A Ries
(74) *Attorney, Agent, or Firm* — Kelsey M. Skodje

(57) ABSTRACT

A system, method, and computer program product for text annotation. The system includes at least one processing component, at least one memory component, an annotation corpus, and a document processor. The document processor is configured to receive a document including at least one annotated text span. The at least one annotated text span is annotated with a type from a type system (e.g., a domain-specific type system). The document processor is also configured to extract linguistic features of the at least one annotated text span, and generate a type attribute for the type based on the extracted linguistic features. Further, the document processor is configured to receive a new annotated text span, which is annotated with the type. The document processor extracts linguistic features of the new annotated text span, and determines whether the linguistic features match the type attribute.

20 Claims, 5 Drawing Sheets

(56) References Cited

U.S. PATENT DOCUMENTS

| | | | | |
|---|---|---|---|---|
| 2015/0074507 A1* | 3/2015 | Riediger | ............ | G06K 9/00456 |
| | | | | 715/230 |
| 2015/0309992 A1* | 10/2015 | Visel | ....................... | G06F 40/30 |
| | | | | 704/9 |
| 2017/0103338 A1* | 4/2017 | Zhang | ..................... | G06F 40/49 |
| 2018/0300300 A1* | 10/2018 | Riediger | ................ | G06F 16/00 |
| 2019/0005027 A1* | 1/2019 | He | ......................... | G06N 20/00 |
| 2020/0057810 A1* | 2/2020 | Matskevich | .......... | G06F 40/211 |
| 2020/0293712 A1* | 9/2020 | Potts | ..................... | G16H 10/60 |
| 2020/0334331 A1* | 10/2020 | Cason | ................... | G06N 20/00 |

OTHER PUBLICATIONS

"ML data annotations made super easy for teams," Dataturks—Online tool to build Image Bounding Box, NER, NLP and other ML datasets, printed: Aug. 7, 2019, 10 pgs, https://dataturks.com/.

"Named Entity Recognition," Prodigy—an annotation tool for AI, Machine Learning & NLP, printed: Aug. 7, 2019, 8 pgs, https://prodi.gy/features/named-entity-recognition.

"Japanese input method," Wikipedia, printed: Aug. 7, 2019, 6 pgs, https://en.wikipedia.org/wiki/Japanese_input_method.

"Watson Knowledge Studio," IBM Watson, printed: Aug. 7, 2019, pp. 1-8 https://www.ibm.com/watson/services/knowledge-studio/.

Mell et al., "The NIST Definition of Cloud Computing", Recommendations of the National Institute of Standards and Technology, Special Publication 800-145, Sep. 2011, 7 pages.

Leech, G., "Developing Linguistic Corpora: a Guide to Good Practice," Arts and Humanities Data Service, printed: Feb. 25, 2020, 19 pgs, http://users.ox.ac.uk/~martinw/dlc/chapter2.htm#section4.

\* cited by examiner

LINGUISTICALLY CONSISTENT DOCUMENT ANNOTATION

BACKGROUND

The present disclosure relates to text annotation and, more specifically, to maintaining consistency of text annotation based on syntactical attributes.

Text annotation can be used to develop domain specific machine learning models in natural language processing (NLP) systems. A human annotator can select a span of text (e.g., a word, phrase, or other text portion), and annotate the selection with a predefined label indicating its type. Examples of types can include parts of speech, locations, jobs, actions, drove, numerical values, times, dates, units of measurement, etc. The types can be from predefined sets and/or custom sets. These sets can also be referred to as "type systems". The annotated text is used to build the domain specific machine learning model.

SUMMARY

Various embodiments are directed to a system that includes at least one processing component, at least one memory component, an annotation corpus, and a document processor. The document processor is configured to receive a document including at least one annotated text span. The at least one annotated text span is annotated with a type from a type system (e.g., a domain-specific type system). The document processor is also configured to extract linguistic features of the at least one annotated text span, and generate a type attribute for the type based on the extracted linguistic features. Further, the document processor is configured to receive a new annotated text span, which is annotated with the type. The document processor extracts linguistic features of the new annotated text span, and determines whether the linguistic features match the type attribute. In some embodiments, the document processor determines that the features do not match the type attribute. In response, an annotation module can generate a corrected text span. The linguistic features can be syntax tree depth values, and the type attribute can be an average syntax tree depth value. The type attribute can also be a part-of-speech in some embodiments.

Further embodiments are directed to a method that includes receiving a document that includes at least one annotated text span. The at least one annotated text span is annotated with a type from a type system (e.g., a domain-specific type system). The method also includes extracting linguistic features of the at least one annotated text span, and generating a type attribute for the type based on the extracted linguistic features. Further, the method includes receiving a new annotated text span, which is annotated with the type, and extracting linguistic features of the new annotated text span. The method includes determining whether the linguistic features match the type attribute. In some embodiments, it is determined that the features do not match the type attribute. In response, a corrected text span can be generated. The linguistic features can be syntax tree depth values, and the type attribute can be an average syntax tree depth value. The type attribute can also be a part-of-speech in some embodiments.

Additional embodiments are directed to a computer program product for text annotation. The computer program product includes a computer readable storage medium having program instructions embodied therewith, the program instructions executable by a processor to cause a device to perform a method that includes receiving a document that includes at least one annotated text span. The at least one annotated text span is annotated with a type from a type system. The method also includes extracting linguistic features of the at least one annotated text span, and generating a type attribute for the type based on the extracted linguistic features. Further, the method includes receiving a new annotated text span, which is annotated with the type, and extracting linguistic features of the new annotated text span. The method includes determining whether the linguistic features match the type attribute. In some embodiments, it is determined that the features do not match the type attribute. In response, a corrected text span can be generated. The linguistic features can be syntax tree depth values, and the type attribute can be an average syntax tree depth value. The type attribute can also be a part-of-speech in some embodiments.

DETAILED DESCRIPTION

Figure 1:
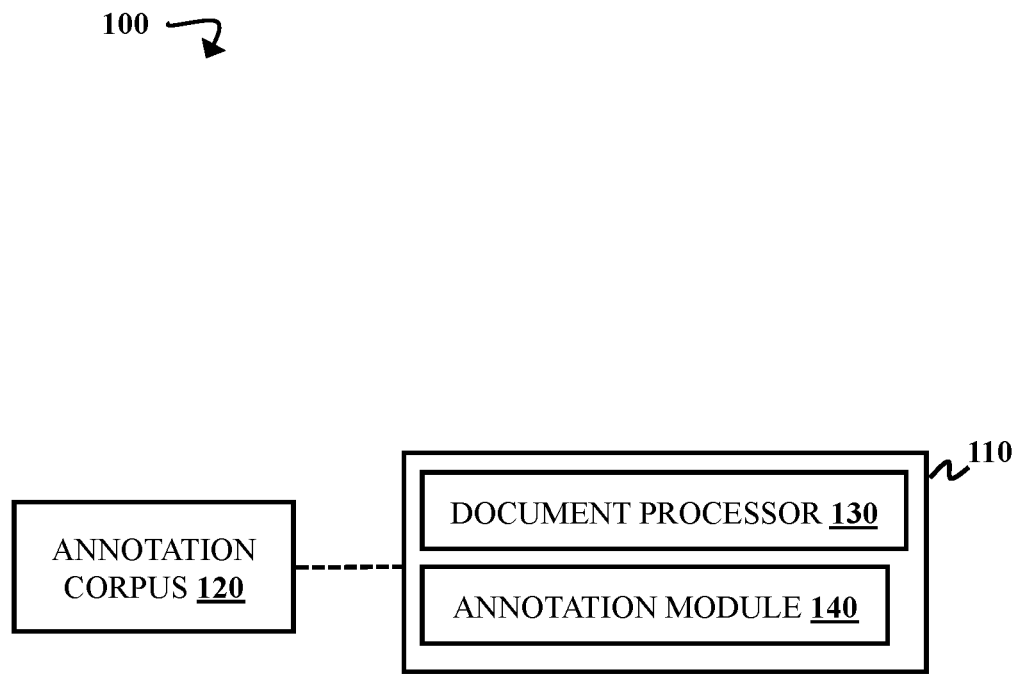
FIG. 1 is a block diagram illustrating a text annotation environment, according to some embodiments of the present disclosure.

Natural language processing (NLP) systems can use text annotation to develop domain-specific machine learning models. A human or machine annotator selects portions ("spans") of text in a document that are considered relevant to a particular domain or application. The annotator then annotates each selected text span with a type from a set of predefined types ("type system"). The type system used in an annotation process can be a preexisting type system or a customized (e.g., by adding new types) type system. However, a user can also build a custom type system without a preexisting set of types. Herein, type annotations are written in uppercase letters for illustrative purposes. However, annotations can be displayed in any format, such as lower-case letters or both upper- and lower-case letters, colors, shapes, etc.

In one example, a text span such as "915 $1^{st}$ Street" can be annotated with the type ADDRESS. Additional examples of entity types and text spans (in parentheses) can include OCCUPATION (e.g., teacher), ACTION (e.g., ran, go shopping, walked the dog, etc.), VALUE (e.g., 100, $15, 10 Watts), TIME (e.g., 7 pm, seven o'clock, 19:00, etc.), DATE (e.g., December 17, 01/06/92, this Friday, next month, etc.), UNIT (e.g., "g", "hours", "in.", etc.), etc. Type systems can include subtypes. For example, the entity type UNIT can have subtypes such as TIME, MASS, TEMPERATURE, etc. In addition to entities, types can also define relationships (e.g., COLLEAGUE, PARENT_OF, etc.). Types can also define roles (e.g., JOB_TITLE), mention types (e.g., NAME, PRONOUN, etc.), and/or mention classes (e.g., SPECIFIC, GENERIC, NEGATED, etc.).

Type systems can have various levels of specificity, and a mention can be annotated with more than one type. For example, a mention such as "Scott works for a library" can be annotated with a relation type (e.g., EMPLOYED_BY), where "Scott" is employed by "a library". In this mention, "Scott" can also be annotated with types such as a mention type (e.g., NAME), an entity type (e.g., PERSON), and/or entity subtype (e.g., LIBRARY_EMPLOYEE). Additionally, "a library" can be annotated with types such as entity type (e.g., ORGANIZATION), entity subtype (e.g., LIBRARY), and/or mention class (e.g., GENERIC).

However, when inconsistent annotations are added to an annotated corpus, a machine learning model trained on the corpus can be adversely affected. For example, annotators may select and annotate an incomplete span. Additionally, there can be inconsistencies between different annotators or annotations made by one annotator at different times. For example, a portion of text in a document can be: "It was stored in the Library of Congress." An annotator may select the span "stored in the Library of Congress" to annotate with type STORAGE_LOCATION. However, another annotator may instead select the span "Library of Congress" to annotate with the same type. The preferred span can depend, at least in part, on user preference, precedent, domain, and/or planned use of the document. When annotators select text spans inconsistently, the accuracy of the model can be reduced Disclosed herein are techniques for maintaining the consistency of text span selection when building annotated corpora, which can be used to train machine learning models. The consistency is determined based on linguistic (e.g., grammatical) features, such as syntax. The linguistic features of preferred or existing text spans for different types are determined based on analysis of the syntax (e.g., based on a syntax tree diagram) of previous annotations from at least one input document annotated using a given type system. Type attributes are determined for the types based on the linguistic features of corresponding text spans. When a new annotation is added to a text span, it is determined whether the linguistic features of the text span are consistent with ("match") the type attributes of the same annotation type. If the features do not match, a corrected text span is generated to match the type attributes.

FIG. 1 is a block diagram illustrating a text annotation environment 100, according to some embodiments of the present disclosure. The text annotation environment 100 includes an annotation consistency module 110 and an annotation corpus 120. The annotation consistency module 110 includes a document processor 130 and an annotation module 140.

The annotation corpus 120 includes annotations added to portions of text according to a type system, which is a set of definitions that can be used to annotate selected mentions. The type system can be a preexisting general or domain-specific type system. The type system can also be a custom type system input by one or more users. In some embodiments, the type system is a customized preexisting type system. For example, users can add additional types to an existing type system.

The annotation types can include entity types, which are categories to be recognized and annotated in the text, and relation types, which define relationships between pairs of entities in the same sentences. The types can also include subtypes, such as entity subtypes that refine the entity types. For example, when annotating documents associated with a hospital, there can be an entity type "staff" with subtypes defining job titles (e.g., "registered nurse"). Examples of entity types, subtypes, and relation types are discussed in greater detail above. For each annotation type, there can be at least one set of type attributes stored in the annotation corpus 120. Sets of annotation type attributes can include lists of syntax tree phrases (e.g., noun phrases, verb phrases, etc.), syntax tree depths, words, parts-of-speech, etc.

The document processor 130 receives at least one document (not shown), which can contain domain specific content. Herein, a domain is a particular topic or field (e.g., medicine, electronics, retail, weather forecasting, etc.). The documents can be uploaded by one or more users or automatically extracted by the document processor 130 from one or more information sources (e.g., web sources, file storage, block storage, object storage, etc.). The documents can be in any appropriate format, such as text documents in a word processing program, presentations, portable digital format (PDF) files, spreadsheets, rich text format (rtf) files, etc.

In some embodiments, a document can include at least one annotation added prior to being received by the document processor 130. Annotations can also be added after the documents are received. Annotations are input by users upon locating relevant mentions in the text of at least one input document. Users select text spans containing mentions (e.g., by using a cursor to click on a word, clicking and dragging a cursor across a word or phrase, etc.). When a text span has been selected, the user selects a type from the type system, and annotates the span with a label for the type. In other embodiments, the user can select a type label before selecting the span. In some embodiments, the user inputs the annotation by clicking on a type label displayed in the user interface. The user can also select the type label from one or more suggested labels. In other embodiments, the user can input the annotation by typing a label. In some embodiments, one or more of the annotations can be made automatically.

When an annotation has been input, the annotation module 140 can generate annotation display features, which are displayed on the user interface. For example, the annotation module 140 can generate a type label. The type label can optionally be displayed near (e.g., above or in a margin) the corresponding mention. In some embodiments, the type label is displayed only when the mention is selected (e.g., by clicking on or hovering over the mention). Additionally, the annotated text span can be highlighted with a colored bar or displayed in a text color that is different from the unannotated text. However, any appropriate display technique can be used to indicate the presence of an annotation. For example, the annotated mention can be indicated by underlining or displaying the text span in bold or italics. In some embodiments, the annotated text span can appear unaltered unless a user selects an option for displaying annotations. Type labels can also be displayed in another window or panel of the user interface.

The document processor 130 extracts linguistic features from annotated text spans in the documents. However, the document processor 130 can extract linguistic features from both annotated and unannotated text in some embodiments. Linguistic feature extraction can be carried out using any appropriate linguistic/grammatical feature extraction techniques. The linguistic features can be obtained via syntactic parsing, such as constituency- and/or dependency-based parsing. The linguistic features can also be extracted with morphological analysis (e.g., sentence split, tokenization, part-of-speech (POS) tagging, etc.) and/or semantic analysis of the text. The document processor 130 determines type attributes based on the linguistic features of text spans annotated with the same types. Type attributes (e.g., average parse tree depths, frequently used words, parts-of-speech, phrase types, average word count, etc.) for a type are based on linguistic features extracted from text spans annotated with this type.

When a new annotation is added to a document according to the same type system, the document processor 130 determines whether linguistic features of the new annotated text span match type attributes of text spans of the same type stored in the annotation corpus 120. This determination is based on comparing linguistic features (e.g., syntactic, morphological, etc.) of the text spans. For example, the document processor 130 can determine whether a feature such as syntax tree depth of a new annotated text span matches (e.g., is within a threshold similarity range) an average syntax tree depth determined for text spans of the same type in the annotated corpus 120. The document processor 130 can also determine similarity based on features such as word count, presence of particular words, type and/or number of phrases (e.g., noun phrases, prepositional phrase, verb phrases, etc.), constituency tree depth, dependency tree depth, etc.

In some embodiments, the document processor 130 determines whether the annotated text span contains the same part-of-speech as the same type in the corpus 120. For example, a type system can include the following types: COMPANY, COMPANY_LOCATION, and COMPANY_LOCATOR. A sentence in a document can be "Company A is based in Location 1," with selected text spans (underlined) and their annotations (bracketed) as follows: CompanyA [COMPANY], based [COMPANY_LOCATOR], and Location1 [COMPANY_LOCATION]. The document processor 130 can extract text features from the text spans, and map the features to the types to generate a set of type attributes. For example, when parts-of-speech features are extracted, the type attributes noun, verb, and noun can be mapped to COMPANY, COMPANY_LOCATOR, and COMPANY_LOCATION, respectively. When a new annotated text span is identified as a noun, the document processor 130 can determine that the types COMPANY and COMPANY_LOCATION are more likely matches than COMPANY_LOCATOR because the latter has the type attribute verb.

If the linguistic features of the new annotated text span do not match the corresponding type attributes, the annotation module 140 generates a corrected text span. The corrected text span can be longer or shorter than the new annotated text span so that the corrected text span matches the corresponding type attributes. In some embodiments, the annotation module 140 generates a suggested text span correction for the new annotation, which is displayed on the user interface. For example, the original text span annotated by the user can be indicated by a colored bar surrounding the span. If the suggested span correction lengthens the span, a differently colored bar can be displayed surrounding the suggested additional text. If a user selects the suggested correction, the user interface can be altered so that the same color bar is surrounding the corrected text span. In other embodiments, the annotation module 140 automatically corrects the new span. A user can then accept or reject the automatic correction. When an automatic or suggested correction has been accepted, the corpus 120 is updated to include the modified annotated text span. However, when a correction is rejected, the annotation corpus 120 can be updated to include the originally entered new annotated text span.

Figure 2:
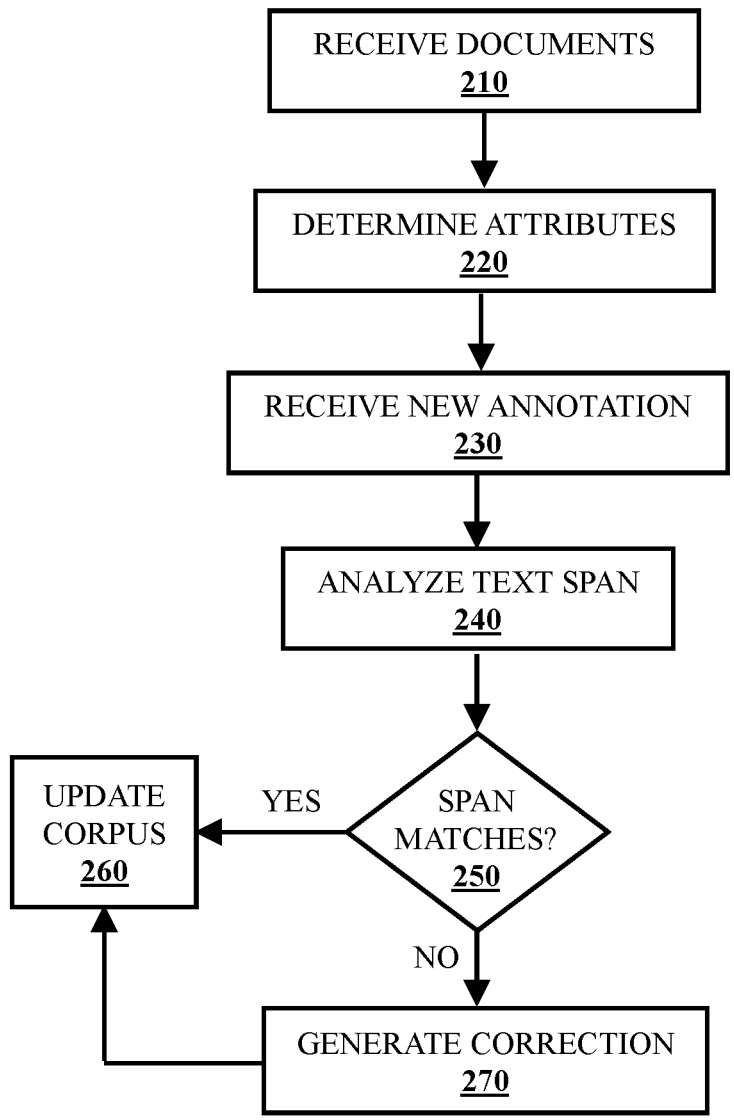
FIG. 2 is a flow diagram illustrating a process of text annotation, according to some embodiments of the present disclosure.

FIG. 2 is a flow diagram illustrating a process 200 of text annotation, according to some embodiments of the present disclosure. To illustrate process 200, but not to limit embodiments, FIG. 2 is described within the context of the text annotation environment 100 of FIG. 1. Where elements referred to in FIG. 2 are identical to elements shown in FIG. 1, the same reference numbers are used in both Figures.

Documents are received by the document processor 130. This is illustrated at step 210. The documents can be input by one or more users or automatically sent to the document processor 130. While multiple documents are illustrated in FIG. 2, it should be noted that a single document can be received in some embodiments. The received documents include one or more annotated text spans in some embodiments. However, annotations can also be added after the documents are received. The annotations are input according to a type system (e.g., a domain-specific type system) of the annotation corpus 120.

Examples of annotation guidelines and/or corpora that can be used can include English PropBank Annotation, the Brown University Standard Corpus of Present-Day American English (Brown Corpus) and Brown family of corpora (e.g., the SUSANNE corpus), Corpus of Contemporary American English, Template Tagger, XML-compliant annotation, Spoken English Corpus (SEC), Machine-Readable Spoken English Corpus (MARSEC), Aix-MARSEC, Michigan Corpus of Academic Spoken English (MICASE), etc. However, any annotation techniques can be used (e.g., domain-specific corpora, custom and/or expanded corpora, etc.). The annotation corpus 120 can also include languages other than English, such as any human- or machine-readable language.

Type attributes are determined based on features of annotated text spans in the received documents. This is illustrated at step 220. The document processor 130 carries out a linguistic analysis (e.g., morphological analysis, syntactic analysis, etc.) of annotated text spans in the documents. Examples of techniques that can be used for the linguistic analysis can include link grammar, vector space models, parsing algorithms (e.g., LL parsers, LR parsers, Recursive Descent parsers, Earley parser, Pratt parser, Packrat parser, parser combinators, Shift-reduce parsers, Cocke-Younger-Kasami (CYK) parser, etc.), and POS taggers.

The analysis extracts linguistic features of the text spans. For example, linguistic features can include parts-of-speech, syntax and/or morphological parse tree depth, words, etc. The document processor 130 maps extracted linguistic features of each annotated text span to the annotation type selected by a user for the span. Type attributes are determined based on these linguistic features.

In an example, a document can contain readers' feedback about a book. The document can include mentions annotated with type: FEEDBACK. Examples such as these can include the following text, where the annotated spans are underlined: "Sophie wassurprisedbytheending of chapter nine. Arthur askedforaglossary in the last pages. Jack hadaquestionaboutthefourthchapter." These annotated text spans each include the features: verb phrase followed by one prepositional phrase. Therefore, the type FEEDBACK can have a type attribute indicating a verb phrase followed by one prepositional phrase.

A new annotation is received. This is illustrated at step 230. A user selects a text span from a document (e.g., a document received at step 210 or another document being annotated with the same type system as the documents received at step 210). The user annotates the selected text span with an annotation type from the type system of the annotation corpus 120. Continuing the previous example, a user can annotate another mention in the document containing readers' feedback about the book. For example, the user can add a new annotation (underlined) to the sentence "Richard likedlearning about the topic of the book," with the type FEEDBACK.

The new annotated text span is analyzed to extract linguistic features. This is illustrated at step 240. The document processor 130 can analyze the text using any appropriate linguistic analysis techniques, such as parsing algorithms, grammatical similarity algorithms, POS taggers, etc. Examples of these techniques are discussed in greater detail above. Syntactic and/or morphological features of the annotated text span are extracted, and compared to type attributes of the annotation type. For example, the document processor 130 can determine, via POS tagging, that the annotated text span is a singular noun (e.g., "shoe"). Additional examples of linguistic features (e.g., parse tree depth) that can be extracted from the annotated text span are discussed in greater detail above. Returning again to the previous example, the document processor can extract a feature indicating that the text span of the new FEEDBACK annotation (likedlearning) is a verb phrase.

It is then determined whether linguistic features extracted from the text span of the new annotation match type attributes corresponding to the same annotation type. This is illustrated at step 250. The document processor 130 can use various natural language processing and similarity measures to determine whether the linguistic features of the new annotation text span match attributes of its annotation type. Examples of similarity measures that can be used can include grammatical similarity algorithms, Jaccard similarity, cosine similarity, Euclidean distance, Language Technology Platform (LTP) of Harbin Institute of Technology, kappa coefficient (K), etc.

In some embodiments, a type attribute is a syntactic tree depth. The syntactic tree depth of the new annotated text span (e.g., 0.7) can be compared to an average syntactic tree depth of text spans with the same annotation type. If the syntactic tree depth of the new annotation text span is within a similarity range (e.g., ±0.1) or above a threshold similarity value (e.g., 0.95, 90%, etc.) to the average syntactic tree depth, the new annotated text span can be identified as matching the syntactic tree depth type attribute. In some embodiments, the new annotated text span is determined to match when it matches one type attribute or all type attributes of its annotation type. However, in instances where a selected type includes more than one type attribute, the new annotated text span may be considered a match only when it matches a threshold number of type attributes.

If the new annotated text span matches the selected type, the annotation corpus 120 is updated. This is illustrated at step 260. The linguistic features determined for the new text span are added to the annotation corpus 120. At least one updated type attribute can be determined for the type corresponding to the new annotation. The updated type attribute can be based on the linguistic features of the previous and new text spans annotated with the type. In some embodiments, new type attributes can be determined for the type based on additional linguistic features of the matching text span. When the annotation corpus 120 has been updated, the machine learning model trained on the corpus 120 can be updated as well.

However, if it is determined that the new text span does not match the type, a corrected text span is generated. This is illustrated at step 270. The annotation module 140 can generate a corrected text span longer or shorter than the user-selected new annotated text span. The corrected text span is a text span that is a closer match to the type attribute than the user-selected text span. The new annotated text span can be automatically replaced with the corrected text span or the corrected text span can be displayed as a suggested correction. This is discussed in greater detail with respect to FIG. 1. The user accepts or rejects the automatic or suggested correction.

In the above example involving the book feedback annotations, the new annotated text span in the sentence "Richard likedlearning about the topic of the book," is inconsistent with the FEEDBACK type attribute as it begins with a verb phrase, but does not end in a prepositional phrase. The annotation module 140 can therefore generate a corrected text span, "Richard likedlearningaboutthetopic of the book." In some embodiments, the corrected text span can be displayed as "Richard likedlearningaboutthetopic of the book," where the suggested correction is indicated by a dashed underline. The user then accepts or rejects the corrected text span. In other embodiments, the annotation can be automatically updated to include the corrected text span. The user can optionally undo the automatic correction.

Process 200 then continues to step 260 where the annotation corpus 120 is updated with the annotated text span selected by the user. If the user accepts the correction, the corrected text span generated at step 270 is added to the corpus 120. However, if the user rejects the correction, the original annotated text span received at step 230 is added to the corpus 120. In some embodiments, the user can reject the correction, and instead modify the text span selection for the new annotation. Process 200 can then return to step 240 wherein the user-modified text span is analyzed. The corrected or original annotated text span is then added to the annotation corpus 120. Updating the annotation corpus 120 is discussed in greater detail above with respect to step 260. Process 200 can end when the corpus has been updated at step 120. However, process 200 can return to step 210 if new documents are received, or to step 230 if new annotations are received.

Figure 3:
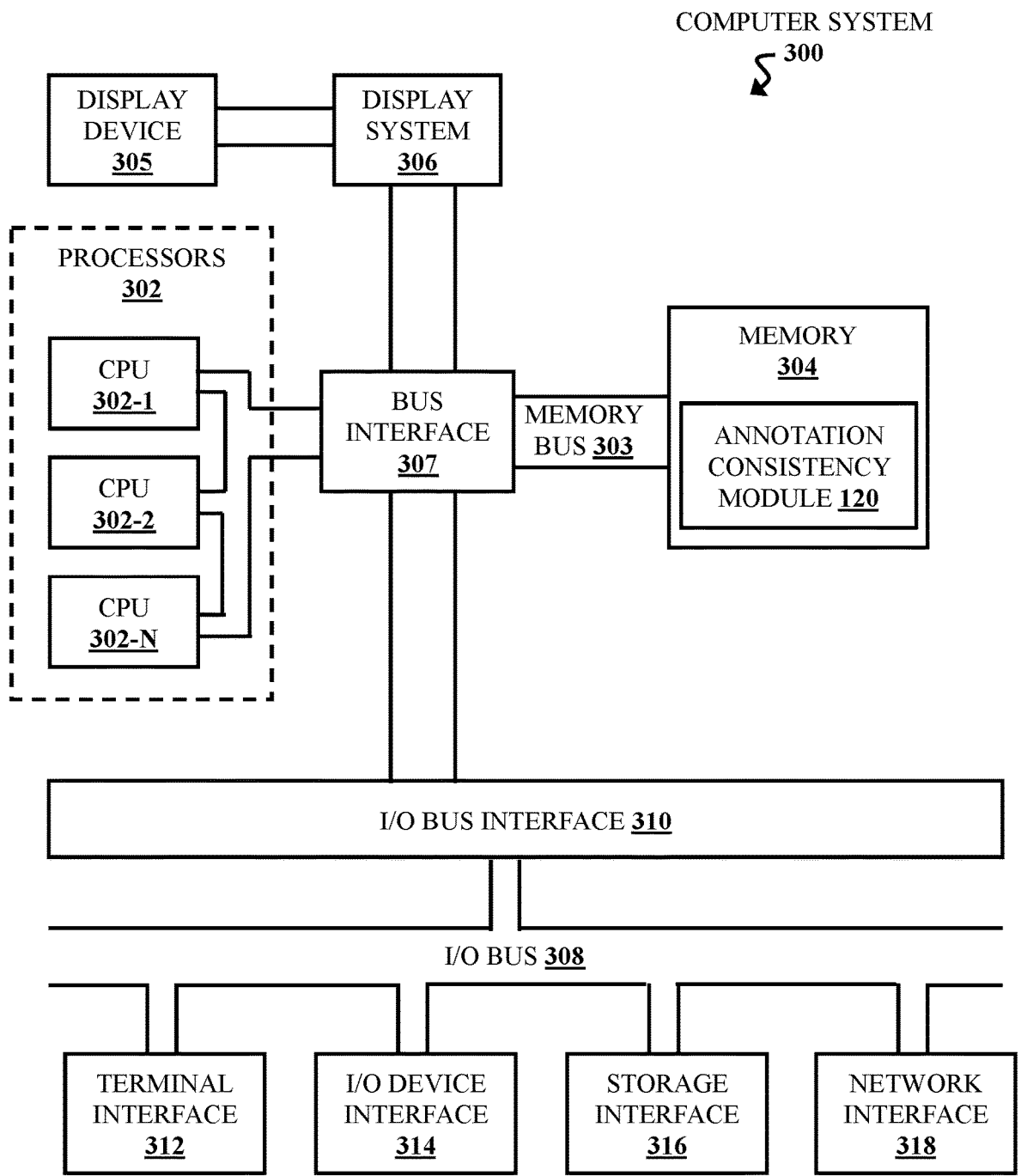
FIG. 3 is a block diagram illustrating a computer system, according to some embodiments of the present disclosure.

FIG. 3 is a block diagram illustrating an exemplary computer system 300 that can be used in implementing one or more of the methods, tools, components, and any related functions described herein (e.g., using one or more processor circuits or computer processors of the computer). In some embodiments, the major components of the computer system 300 comprise one or more processors 302, a memory subsystem 304, a terminal interface 312, a storage interface 316, an input/output device interface 314, and a network interface 318, all of which can be communicatively coupled, directly or indirectly, for inter-component communication via a memory bus 303, an input/output bus 308, bus interface unit 307, and an input/output bus interface unit 310.

The computer system 300 contains one or more general-purpose programmable central processing units (CPUs) 302-1, 302-2, and 302-N, herein collectively referred to as the CPU 302. In some embodiments, the computer system 300 contains multiple processors typical of a relatively large system; however, in other embodiments the computer system 300 can alternatively be a single CPU system. Each CPU 302 may execute instructions stored in the memory subsystem 304 and can include one or more levels of on-board cache.

The memory 304 can include a random-access semiconductor memory, storage device, or storage medium (either volatile or non-volatile) for storing or encoding data and programs. In some embodiments, the memory 304 represents the entire virtual memory of the computer system 300, and may also include the virtual memory of other computer systems coupled to the computer system 300 or connected via a network. The memory 304 is conceptually a single monolithic entity, but in other embodiments the memory 304 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory can be further distributed and associated with different CPUs or sets of CPUs, as is known in any of various so-called non-uniform memory access (NUMA) computer architectures.

These components are illustrated as being included within the memory 304 in the computer system 300. However, in other embodiments, some or all of these components may be on different computer systems and may be accessed remotely, e.g., via a network. The computer system 300 may use virtual addressing mechanisms that allow the programs of the computer system 300 to behave as if they only have access to a large, single storage entity instead of access to multiple, smaller storage entities. Thus, though the annotation consistency module 110 and annotated corpus 120 are illustrated as being included within the memory 304, components of the memory 304 are not necessarily all completely contained in the same storage device at the same time. Further, although these components are illustrated as being separate entities, in other embodiments some of these components, portions of some of these components, or all of these components may be packaged together.

In an embodiment, the annotation consistency module 110 and the annotation corpus 120 include instructions that execute on the processor 302 or instructions that are interpreted by instructions that execute on the processor 302 to carry out the functions as further described in this disclosure. In another embodiment, the annotation consistency module 110 and the annotated corpus 120 are implemented in hardware via semiconductor devices, chips, logical gates, circuits, circuit cards, and/or other physical hardware devices in lieu of, or in addition to, a processor-based system. In another embodiment, the annotation consistency module 110 and the annotated corpus 120 include data in addition to instructions.

Although the memory bus 303 is shown in FIG. 3 as a single bus structure providing a direct communication path among the CPUs 302, the memory subsystem 304, the display system 306, the bus interface 307, and the input/output bus interface 310, the memory bus 303 can, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the input/output bus interface 310 and the input/output bus 308 are shown as single respective units, the computer system 300 may, in some embodiments, contain multiple input/output bus interface units 310, multiple input/output buses 308, or both. Further, while multiple input/output interface units are shown, which separate the input/output bus 308 from various communications paths running to the various input/output devices, in other embodiments some or all of the input/output devices may be connected directly to one or more system input/output buses.

The computer system 300 may include a bus interface unit 307 to handle communications among the processor 302, the memory 304, a display system 306, and the input/output bus interface unit 310. The input/output bus interface unit 310 may be coupled with the input/output bus 308 for transferring data to and from the various input/output units. The input/output bus interface unit 310 communicates with multiple input/output interface units 312, 314, 316, and 318, which are also known as input/output processors (IOPs) or input/output adapters (IOAs), through the input/output bus 308. The display system 306 may include a display controller. The display controller may provide visual, audio, or both types of data to a display device 305. The display system 306 may be coupled with a display device 305, such as a standalone display screen, computer monitor, television, or a tablet or handheld device display. In alternate embodiments, one or more of the functions provided by the display system 306 may be on board a processor 302 integrated circuit. In addition, one or more of the functions provided by the bus interface unit 307 may be on board a processor 302 integrated circuit.

In some embodiments, the computer system 300 is a multi-user mainframe computer system, a single-user system, or a server computer or similar device that has little or no direct user interface, but receives requests from other computer systems (clients). Further, in some embodiments, the computer system 300 is implemented as a desktop computer, portable computer, laptop or notebook computer, tablet computer, pocket computer, telephone, smart phone, network switches or routers, or any other appropriate type of electronic device.

It is noted that FIG. 3 is intended to depict the representative major components of an exemplary computer system 300. In some embodiments, however, individual components may have greater or lesser complexity than as represented in FIG. 3, Components other than or in addition to those shown in FIG. 3 may be present, and the number, type, and configuration of such components may vary.

In some embodiments, the data storage and retrieval processes described herein could be implemented in a cloud computing environment, which is described below with respect to FIGS. 4 and 5. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
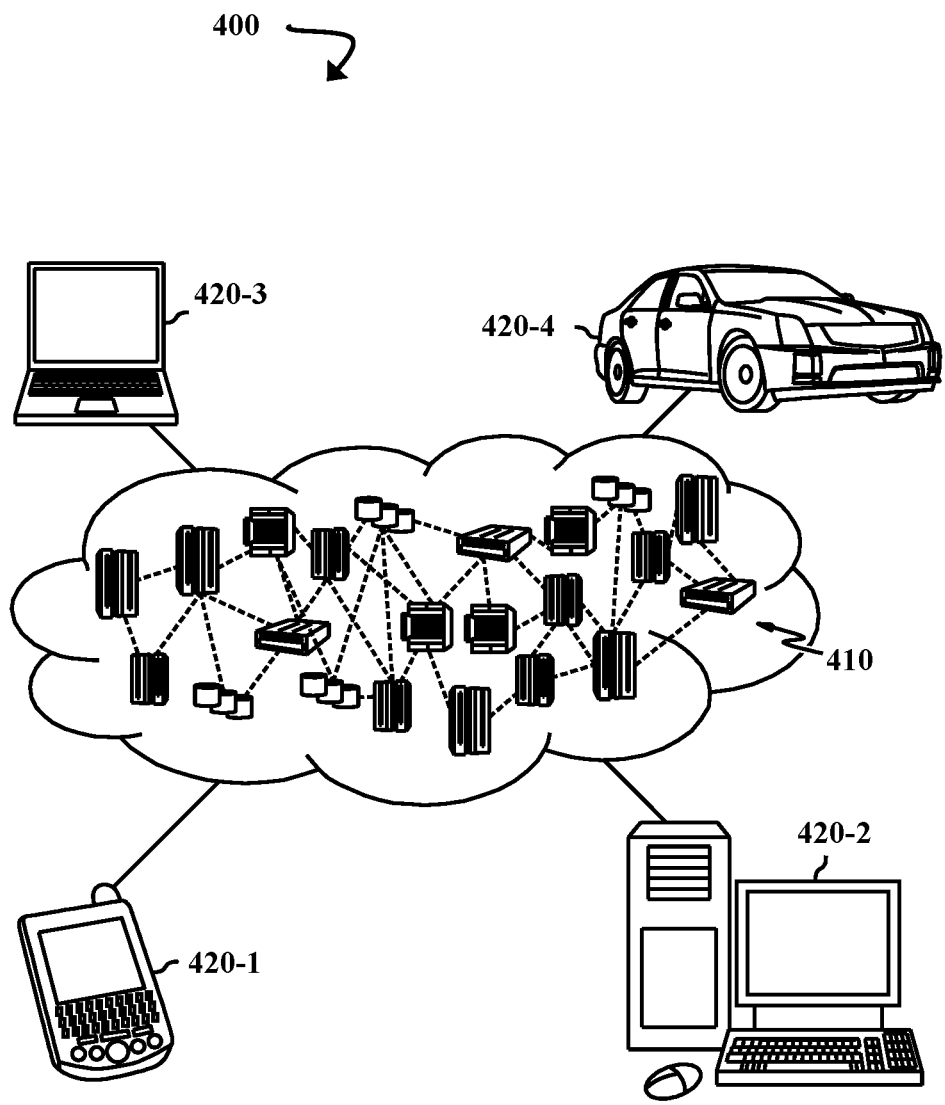
FIG. 4 is a block diagram illustrating a cloud computing environment, according to some embodiments of the present disclosure.

FIG. 4 is a block diagram illustrating a cloud computing environment 400, according to some embodiments of the present disclosure. As shown, cloud computing environment 400 includes one or more cloud computing nodes 410 with which local computing devices used by cloud consumers, such as, for example, personal digital assistant (PDA) or cellular telephone 420-1, desktop computer 420-2, laptop computer 420-3, and/or automobile computer system 420-4 may communicate. Nodes 410 may communicate with one another. They may be grouped (not shown) physically or virtually, in one or more networks, such as Private, Community, Public, or Hybrid clouds as described hereinabove, or a combination thereof. This allows cloud computing environment 400 to offer infrastructure, platforms and/or software as services for which a cloud consumer does not need to maintain resources on a local computing device. It is understood that the types of computing devices 420-1-420-4 shown in FIG. 4 are intended to be illustrative only and that computing nodes 410 and cloud computing environment 400 can communicate with any type of computerized device over any type of network and/or network addressable connection (e.g., using a web browser).

Figure 5:
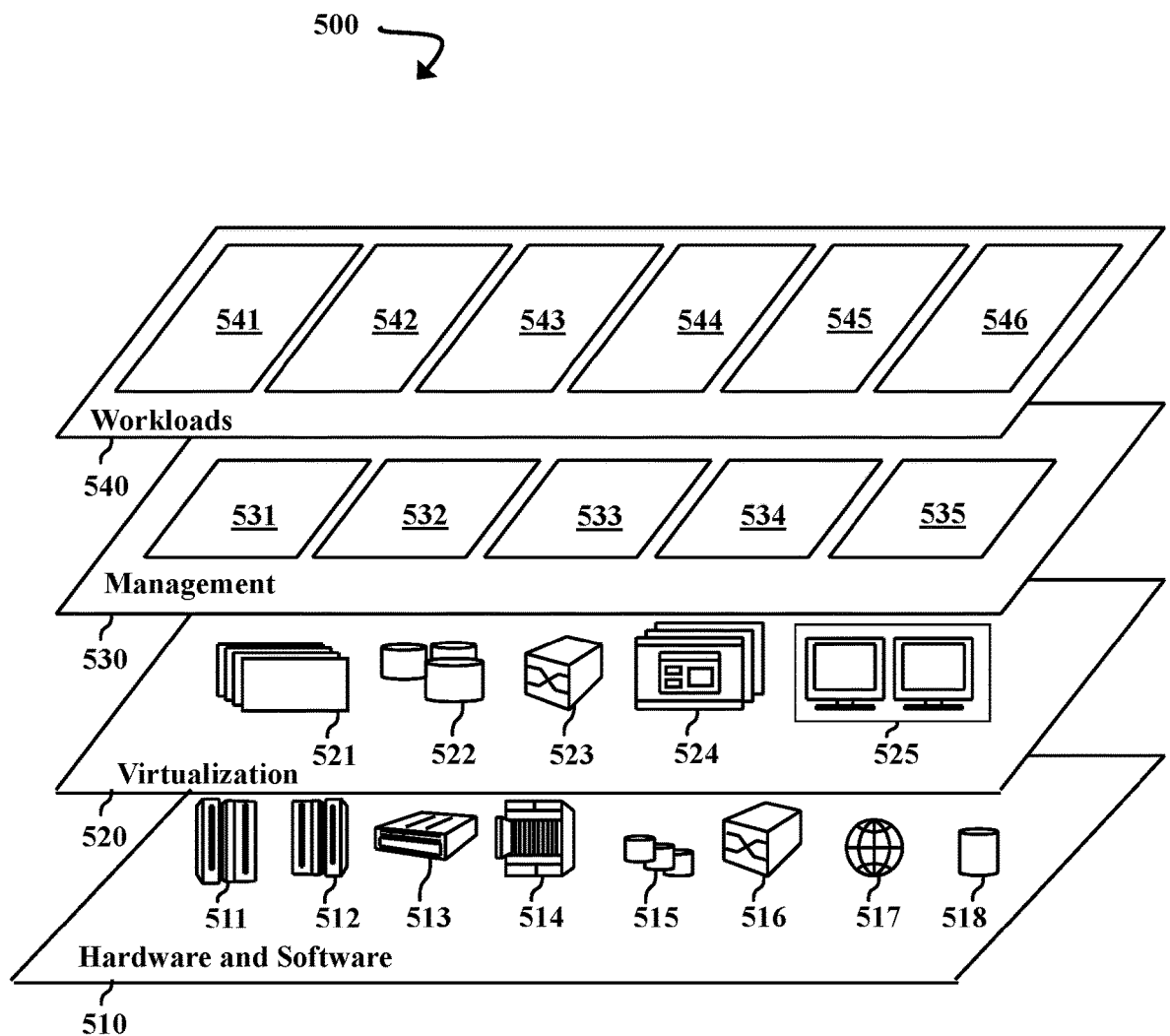
FIG. 5 is a block diagram illustrating a set of functional abstraction model layers provided by the cloud computing environment, according to some embodiments of the present disclosure.

FIG. 5 is a block diagram illustrating a set of functional abstraction model layers 500 provided by the cloud computing environment 400, according to some embodiments of the present disclosure. It should be understood in advance that the components, layers, and functions shown in FIG. 5 are intended to be illustrative only and embodiments of the invention are not limited thereto. As depicted, the following layers and corresponding functions are provided:

Hardware and software layer 510 includes hardware and software components. Examples of hardware components include: mainframes 511; RISC (Reduced Instruction Set Computer) architecture-based servers 512; servers 513; blade servers 514; storage devices 515; and networks and networking components 516. In some embodiments, software components include network application server software 517 and database software 518.

Virtualization layer 520 provides an abstraction layer from which the following examples of virtual entities may be provided: virtual servers 521; virtual storage 522; virtual networks 523, including virtual private networks; virtual applications and operating systems 524; and virtual clients 525.

In one example, management layer 530 provides the functions described below. Resource provisioning 531 provides dynamic procurement of computing resources and other resources that are utilized to perform tasks within the cloud computing environment. Metering and Pricing 532 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 533 provides access to the cloud computing environment for consumers and system administrators. Service level management 534 provides cloud computing resource allocation and management such that required service levels are met. Service Level Agreement (SLA) planning and fulfillment 535 provide pre-arrangement for, and procurement of, cloud computing resources for which a future requirement is anticipated in accordance with an SLA.

Workloads layer 540 provides examples of functionality for which the cloud computing environment can be utilized. Examples of workloads and functions that can be provided from this layer include: mapping and navigation 541; software development and lifecycle management 542; virtual classroom education delivery 543; data analytics processing 544; transaction processing 545; and supporting annotation consistency 546.

The present disclosure may be a system, a method, and/or a computer program product. The computer program product may include a computer readable storage medium (or media) having computer readable program instructions thereon for causing a processor to carry out aspects of the present disclosure.

The computer readable storage medium is a tangible device that can retain and store instructions for use by an instruction execution device. Examples of computer readable storage media can include an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a component, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the present disclosure.

What is claimed is:

1. A system for text annotation, comprising:
   at least one processing component;
   at least one memory component;
   an annotation corpus; and
   a document processor configured to:
     receive a document including at least one annotated text span, wherein the at least one annotated text span is annotated with a type from a type system;
     extract linguistic features of the at least one annotated text span;
     generate, based on the linguistic features of the at least one annotated text span, a type attribute for the type;
     receive a new annotated text span, wherein the new annotated text span is annotated with the type;
     extract linguistic features of the new annotated text span; and
     determine whether the linguistic features of the new annotated text span match the type attribute.

2. The system of claim 1, wherein the document processor is further configured to determine that the linguistic features of the new annotated text span do not match the type attribute.

3. The system of claim 2, further comprising an annotation module configured to:
   generate a corrected text span in response to the determining that the linguistic features of the new annotated text span do not match the type attribute.

4. The system of claim 1, wherein the linguistic features of the at least one annotated text span are syntax tree depth values.

5. The system of claim 4, wherein the type attribute is an average syntax tree depth value.

6. The system of claim 1, wherein the type system is a domain-specific type system.

7. The system of claim 1, wherein the type attribute is a part-of-speech.

8. A method of text annotation, comprising:
   receiving a document including at least one annotated text span, wherein the at least one annotated text span is annotated with a type from a type system;
   extracting linguistic features of the at least one annotated text span;
   generating, based on the linguistic features of the at least one annotated text span, a type attribute for the type;
   receiving a new annotated text span, wherein the new annotated text span is annotated with the type;
   extracting linguistic features of the new annotated text span; and
   determining whether the linguistic features of the new annotated text span match the type attribute.

9. The method of claim 8, further comprising determining that the linguistic features of the new annotated text span do not match the type attribute.

10. The method of claim 9, further comprising:
    generating a corrected text span in response to the determining that the linguistic features of the new annotated text span do not match the type attribute.

11. The method of claim 8, wherein the linguistic features of the at least one annotated text span are syntax tree depth values.

12. The method of claim 11, wherein the type attribute is an average syntax tree depth value.

13. The method of claim 8, wherein the type system is a domain-specific type system.

14. The method of claim 8, wherein the type attribute is a part-of-speech.

15. A computer program product for text annotation, the computer program product comprising a computer readable storage medium having program instructions embodied therewith, the program instructions executable by a processor to cause a device to perform a method, the method comprising:
    receiving a document including at least one annotated text span, wherein the at least one annotated text span is annotated with a type from a type system;
    extracting linguistic features of the at least one annotated text span;
    generating, based on the linguistic features of the at least one annotated text span, a type attribute for the type;
    receiving a new annotated text span, wherein the new annotated text span is annotated with the type;
    extracting linguistic features of the new annotated text span; and
    determining whether the linguistic features of the new annotated text span match the type attribute.

16. The computer program product of claim 15, further comprising determining that the linguistic features of the new annotated text span do not match the type attribute.

17. The computer program product of claim 16, further comprising:
    generating a corrected text span in response to the determining that the linguistic features of the new annotated text span do not match the type attribute.

18. The computer program product of claim 15, wherein the linguistic features of the at least one annotated text span are syntax tree depth values.

19. The computer program product of claim 18, wherein the type attribute is an average syntax tree depth value.

20. The computer program product of claim 15, wherein the type attribute is a part-of-speech.

* * * * *